May 25, 1926.
Z. C. BRADFORD
1,585,831
ENGINE STARTING AND BATTERY CHARGING APPARATUS
Filed March 27, 1924   3 Sheets-Sheet 1
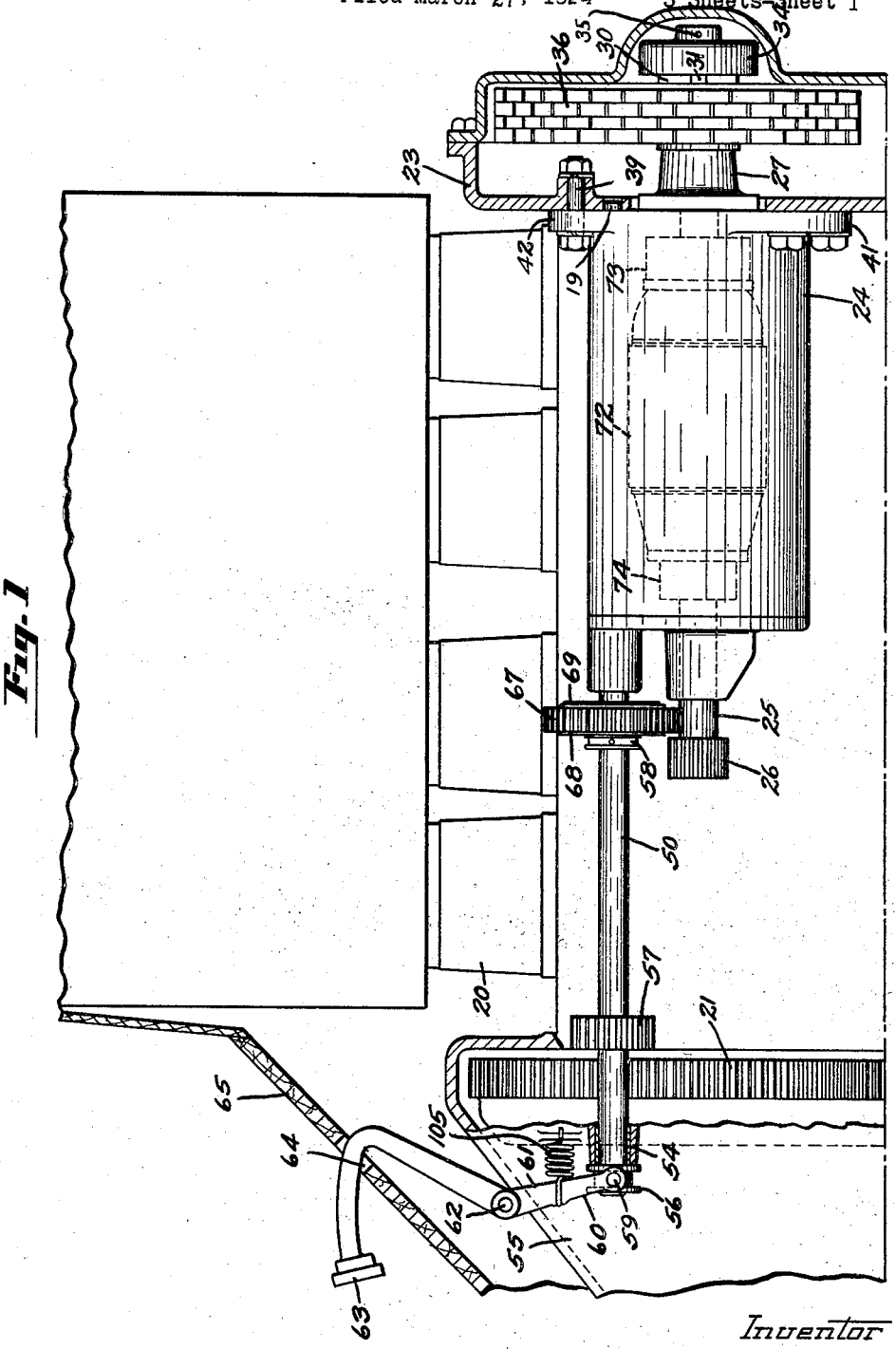

May 25, 1926.  1,585,831

Z. C. BRADFORD

ENGINE STARTING AND BATTERY CHARGING APPARATUS

Filed March 27, 1924 3 Sheets-Sheet 2

Inventor
Zerbe C. Bradford
By Spencer Surall & Hardman
His Attorneys

May 25, 1926.
Z. C. BRADFORD
1,585,831
ENGINE STARTING AND BATTERY CHARGING APPARATUS
Filed March 27, 1924    3 Sheets-Sheet 3
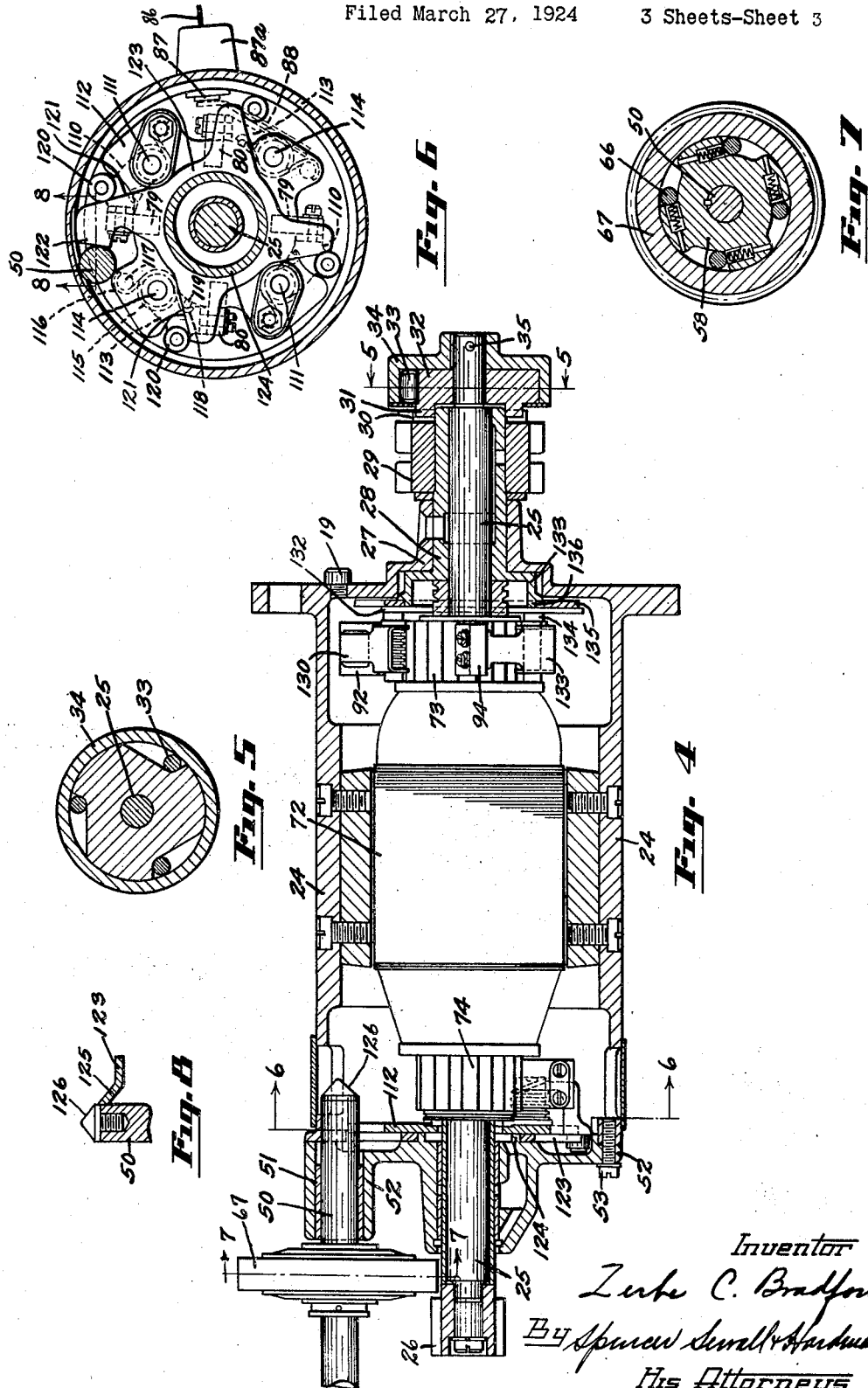

Patented May 25, 1926.

1,585,831

UNITED STATES PATENT OFFICE.

ZERBE C. BRADFORD, OF DAYTON, OHIO, ASSIGNOR TO THE DAYTON ENGINEERING LABORATORIES COMPANY, OF DAYTON, OHIO, A CORPORATION OF OHIO.

ENGINE-STARTING AND BATTERY-CHARGING APPARATUS.

Application filed March 27, 1924. Serial No. 702,458.

This invention relates to electrical starting and battery charging apparatus for automotive vehicles, and more particularly to the type of apparatus known as "single unit" wherein an electric dynamo machine operates as a motor to crank the engine or as a generator to charge a storage battery for storing electrical energy for engine cranking and other purposes.

More specifically this invention relates to improvements in a type of single unit apparatus, a form of which is shown in the Patent No. 1,303,831 to C. F. Kettering. In this patent is disclosed a single unit machine which is mounted adjacent the flywheel of the engine, said flywheel being provided with a gear. The dynamo is connected with the flywheel gear for starting purposes by means of gearing including a gear which is movable into and out of mesh with the flywheel gear. For generating purposes the dynamo is connected with the engine by means of a shaft extending alongside of the crank case and connected with the engine by means of gearing located at the front of the engine.

It is among the objects of the present invention to simplify the construction and arrangement of single unit apparatus of this type in order to reduce the cost of manufacture and to adapt the apparatus for operation by the engine by means of a chain or link-belt drive commonly employed for driving a generator by the engine in conventional two-unit apparatus in engine starting and battery charging systems.

To accomplish this object, the dynamo electric machine is supported adjacent the front end of the engine by the engine timer gear case. The dynamo is driven as a generator by means of gearing located in the timer gear case including a link-belt drive cooperating with a gear on the dynamo shaft which projects into the timer gear case. For engine cranking purposes the dynamo is provided with a gear at the end thereof nearest the flywheel, and this gear is connected by means of a shiftable shaft and gearing with the engine flywheel gear. In order to adjust the link belt the dynamo frame is pivoted upon an axis parallel to and in alignment with the shiftable shaft so that movement of dynamo frame will not change the lateral relation between the flywheel and the intermediate gearing connectable with the gear on the dynamo shaft.

Further objects and advantages of the present invention will be apparent from the following description reference being had to the accompanying drawings, wherein preferred embodiments of one form of the present invention are clearly shown.

In the drawings:

Fig. 1 is a fragmentary side view of an internal combustion engine and a form of the invention applied thereto.

Fig. 4 is a longitudinal sectional view of the dynamo electrical machine shown in Fig. 1 but drawn to a larger scale.

Fig. 5 is a sectional view on line 5—5 of Fig. 4.

Fig. 6 is a sectional view of a brush rigging on the line 6—6 of Fig. 4.

Fig. 7 is a sectional view taken on line 7—7 of Fig. 4.

Fig. 8 is a sectional view on line 8—8 of Fig. 6.

Figure 2:
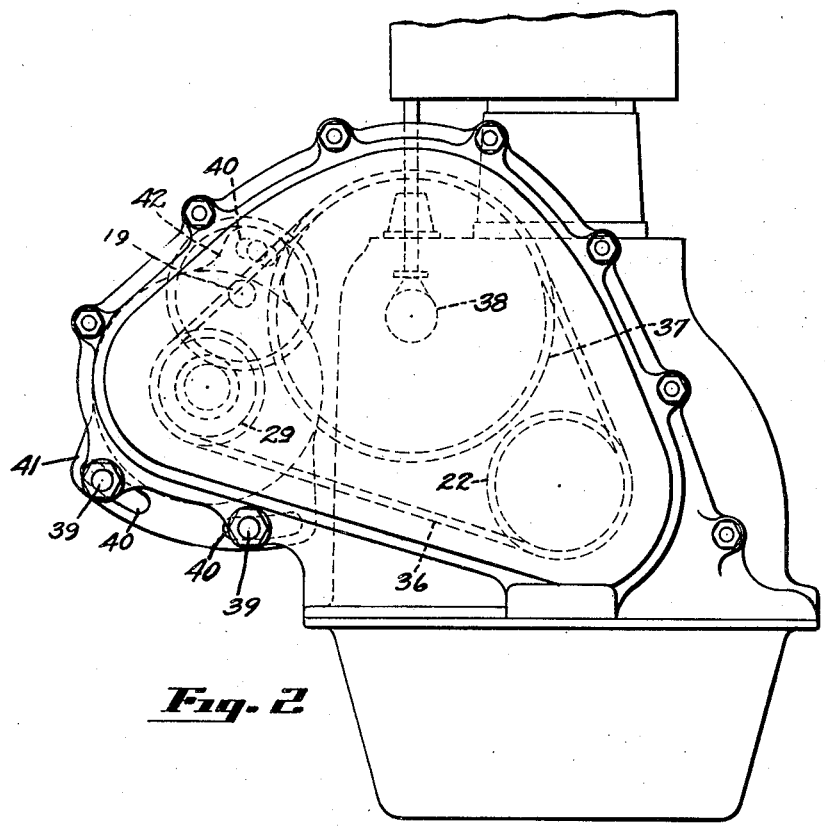
Fig. 2 is a front view of the engine drawn to a smaller scale than Fig. 1.

Referring to the drawings, an internal combustion engine 20 includes a flywheel gear 21 at one end of its crank shaft and a timing gear 22 at the other end thereof. (See Fig. 2). The engine frame provides a timing gear housing 23 which supports the frame 24 of a dynamo electric machine provided with an armature shaft 25 carrying at the end nearest the flywheel a gear 26. Frame 24 is provided with an apertured boss 27 which extends within the timing gear housing 23 and supports a sleeve 28 providing a bearing for the shaft 25 and for a link-belt gear 29. Gear 29 is connected by means of companion clutch members 30 and 31 with the internal member 32 of an overrunning clutch which includes also rollers 33 and a shell 34 which drives the shaft 25 through a pin 35. A link belt 36 connects the gear 22 with a timing gear 37 located on the cam shaft 38 of the engine and with the gear 29. The dynamo frame 24 is pivoted at 19 coaxially with shaft 50 upon a back wall of the timing gear case 23 which projects at one side of the engine crank case, and frame 24 may be secured in various positions of adjustment with respect to the case 23 by means of bolts 39 extending through plain holes in the case 23 and through slots 40 in the flanges 41 and 42 which extend from the dynamo frame 24. In this manner the belt 36 may be adjusted to take up slack.

The gearing for connecting the dynamo, as a starting motor, with the flywheel gear of the engine includes a shiftable shaft 50 having a bearing 51 in the dynamo end frame 52 which is secured by bolts 53 to the dynamo frame 24, and having a bearing 54 provided by the flywheel housing 55. (See Fig. 1). A grooved collar 56, a gear 57 and an interior clutch member 58, (see Fig. 7) of an overrunning clutch are attached to the shaft 50 and rotate therewith. The collar 56 cooperates with studs, one shown at 59, mounted upon the bifurcations 60 of a forked lever 61 attached to a shaft 62 supported by housing 55. Shaft 62 is connected with a pedal 63 extending through an opening 64 in the foot board 65 of the vehicle operated by the engine. The overrunning clutch member 58 cooperates through rollers 66 with a ring gear 67 which is journaled on the clutch member 58 and is confined between side plates 68 and 69 which are endwise movable with the shaft 50. In normal position of the shaft 50 the distance between the end faces of the gears 67 and 26 is less than the distance between the end faces of gears 21 and 57.

Figure 3:
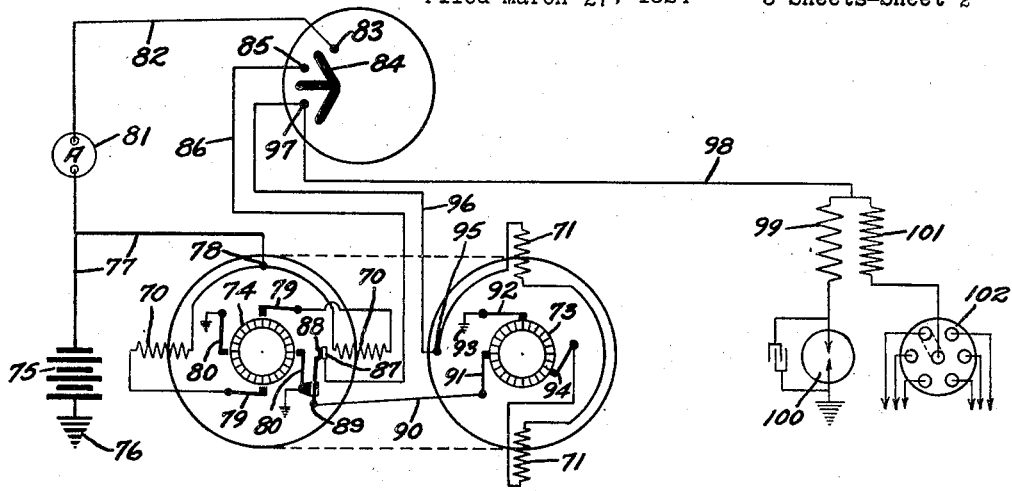
Fig. 3 is a diagrammatical view of electrical circuits.

The dynamo frame 24 supports two sets of field windings, namely series windings 70 used in engine cranking, and shunt windings 71 used during generating. These windings are shown diagrammatically in Fig. 3. The dynamo shaft 25 carries an armature 72 known as a "double-wound" armature having a set of windings for generating purposes connected with the commutator 73, and a set of windings for cranking purposes connected with the commutator 74. The motor windings used for engine starting are connected in series and are of relatively low resistance so that the dynamo may operate with high torque at slow speed to crank the engine. The resistance of the generator windings is relatively high, so that the output of the machine when driven relatively high speed by the engine will be that required for charging storage battery The various electric circuits employed for engine starting and battery charging will be described with reference to Fig. 3. 75 designates a storage battery grounded at 76 and connected by a wire 77 with a terminal 78 connected with the series field windings 70 connected with brushes 79 which are normally out of engagement with the motor commutator 74. The motor armature circuit is completed to ground connection with the battery by means of grounded brushes 80 which are also normally out of engagement with the motor armature 74. By mechanism which will be described later, the brushes 79 and 80 are permitted to move into engagement with the motor commutator 74 in order to complete the high torque cranking circuit. The wire 77 is connected with ammeter 81 connected by wire 82 with a switch contact 83 connectable by a movable contact switch 84 with a switch contact 85. Contact 85 is connected by wire 86 with switch contact 87 located within the dynamo frame. Contact 87 is connected normally with a movable contact 88 pivoted at 89. Contact 88 provides a pivotal mounting for the adjacent motor brush 80, but is insulated from brush 80. The pivot 89 is connected by wire 90 with one of the main generator brushes 91 engaging the generator commutator 73. The other main generator brush is indicated at 92 and is grounded at 93. Generator regulation is provided through the agency of a third brush connection 94 which is attached to the shunt field winding 71 connected through terminal 95 and wire 96 with a switch contact 97. Contact 97 is connected by wire 98 with ignition primary winding 99 which in turn is connected with grounded timer 100. The ignition secondary 101 is grounded through the battery and is connected with a distributor 102. The timer 100 and the distributor 102 are driven by the engine in the usual manner.

To start the engine the switch 84 is moved so as to connect terminal 83, 85 and 97 with the battery 75. The ignition circuit will be completed, and also what is known as the "slow initial movement" circuit, which includes battery 75, wire 77, ammeter 81, wire 82, contacts 83, 84 and 85, wire 86, contacts 87 and 88, pivot 89, contact 90, main brush 91, commutator 73, main brush 92 and ground connections 93 and 76. The dynamo field circuit is also connected and includes contact 84, terminal 97, wire 96, terminal 95, shunt field windings 71, and the third brush 94. The dynamo will now function as a shunt-wound motor. Since the resistance of the dynamo windings now connected is relatively high, the rotation of the shaft 25 will be relatively slow. This slow rotation is used to facilitate connecting gears 26, 67, 57, 21 for engine cranking purposes. To crank the engine the pedal 63 is depressed causing the shaft 50 to move toward the left, as viewed in Fig. 1, the first causing the engagement of gears 26 and 67 and then the engagement of gears 57 and 21. This endwise movement of the shaft 50 causes the motor brushes 79 and 80 to engage the motor commutator 74 and causes the switch contacts 87 and 88 to be separated. When this occurs the slow initial movement circuit through the generator windings will be interrupted and the high torque motor circuit previously described will be completed. The dynamo now operates as a high torque motor to crank the engine. After the engine has become self-operative, the pedal 63 is released. A spring 105 which connects the lever 61 with the engine frame causes the shaft 50 to move to the right, as viewed in Fig. 1, to disconnect the cranking gears. The engine now drives the dynamo as a generator through the link belt 36, gear 29 and overrunning clutch members 32, 33 and 34. The return of the shaft 50 to normal position causes the motor brushes to be lifted or removed from the motor commutator to interrupt the main cranking circuit and re-establish the circuit to the generator armature. The machine then operates as a shunt-wound generator to charge the storage battery and to furnish current to the ignition apparatus.

During engine starting the generating gearing connections are not interfered with, since an overrunning clutch is interposed between the dynamo shaft 25 and the gear 29. In case the shaft 50 is not released after the engine becomes self operative, no harm is done, since the crank connections include the overrunning clutch provided by members 58, 66 and 67.

Mechanism for changing the status of the dynamo electric machine from a shunt machine to a series machine will now be described, reference being made to Figs. 4 and 6. The motor brushes 79 are mounted on arms 110 pivotally mounted upon studs 111 supported by a brush arm plate 112 but insulated therefrom. The brushes 80 are mounted upon arms 113 which are pivoted on studs 114 which are attached to the plate 112. Plate 112 is attached to the dynamo frame which is grounded upon the vehicle frame to which one terminal of the battery is connected, thus a ground connection is provided between brushes 80 and the battery. Each brush arm is resiliently urged toward the commutator 74 by means of a spring having an intermediate portion 115 coiled about a brush arm stud 111, having an end portion 116 bearing against a stud 117 carried by the brush arm plate 112, and having the other end portion 118 bearing against a lug 119 provided by the brush arm. Each brush arm is provided with a roller 120 adapted to be engaged by an inclined camming surface 121 provided on one of the cam arms 122 of a brush arm cam 123. The cam 123 is journaled upon a circular boss 124 extending from the arm 52 and providing a bearing for the cam 123, said bearing being concentric with the shaft 25. The rollers 120 may be made of non-conducting material, but if constructed of conducting material the rollers attached to the brush arms 110 must be insulated from these arms in order that brushes 79 may not be grounded. One of the cam arms 122 is provided with an obliquely disposed lug 125 (see Fig. 8) providing an oblique camming surface adapted to be engaged by the conical end surface 126 provided on the end of shaft 50. Normally the end of the lug 125 is engaged by the cylindrical portion of the shaft 50 (as shown in Fig. 8) so that the cam 123 and brushes are held in the position shown in Fig. 6.

When the shaft 50 is moved to the left, as viewed in Fig. 1, or downwardly as viewed in Fig. 8, to connect the dynamo with the engine for starting, the lug 125 will be engaged by the conical portion 126 of shaft 50 to permit the cam 123 to rotate counter-clockwise as viewed in Fig. 6, so that the motor brushes may be moved by their respective springs into engagement with the motor commutator 74. The right-hand brush arm 113, as viewed in Fig. 6, carries the movable switch contact 88 which is insulated from the brush arm 113. As shown in Fig. 6, the dynamo frame supports the stationary contact 87 which is connected by means of a terminal 87ª with the wire 86. The counterclockwise rotation of the cam 123 will cause the separation of the contact 87 from contact 88 in order to interrupt the generator armature circuit during the cranking operation. The return of shaft 50 to normal position will cause the brush cam 123 to rotate clockwise in order that the parts operated thereby will return to their respective positions shown in Fig. 6, and diagrammatically in Fig. 3.

The generator brush 92 is mounted upon a brush arm 130 attached to a brush arm bracket 132 attached to the frame 24. In order to vary the characteristics of the dynamo operating as a generator the third or regulating brush 94 is adjustable with respect to the commutator 73 by mounting said brush upon a brush arm 133 pivotally mounted on a stud 134 attached to a rotatable brush arm bracket 135 journaled at 136 upon the extension 133 of sleeve 28. The bracket 135 may be secured in any suitable manner in various positions of angular adjustment.

While the form of embodiment of the invention as herein disclosed, constitutes a preferred form, it is to be understood that other forms might be adopted, all coming within the scope of the claims which follow.

What is claimed is as follows:

1. In a single unit engine starting system, the combination with an engine having a crank shaft, of a starting device therefore including, an electric dynamo having a pivotally adjustable mounting upon said engine, means at one end of said dynamo for driving said dynamo from said crank shaft, means at the other end of said dynamo for driving said crank shaft from said dynamo, said first means being adjustable by swinging said dynamo upon its adjustable mounting.

2. In combination, an internal combustion engine having a power shaft, an electric dynamo having an adjustable mounting upon said engine, means at one end of said dynamo for driving said dynamo as a generator from said power shaft, means at the other end of said dynamo for driving said power shaft from said dynamo used as a motor, said first means being adjustable by changing the adjustment of said adjustable mounting without changing the adjustment of said second means.

3. In combination, an internal combustion engine having a power shaft, an electric dynamo having an adjustable mounting upon said engine, means at one end of said dynamo for driving said dynamo as a generator from said power shaft, means at the other end of said dynamo for driving said power shaft from said dynamo used as a motor, each of said means including an overrunning clutch, said first means being adjustable by changing the adjustment of said adjustable mounting without changing the adjustment of said second means.

4. In combination, an internal combustion engine having a power shaft, an electric dynamo having an adjustable mounting upon said engine, a flexible belt means for driving said dynamo as a generator from said power shaft, intermeshing gears for driving said power shaft from said dynamo used as a motor, the tension of said flexible belt means being adjustable by moving said dynamo upon said adjustable mounting without changing the adjustment of said intermeshing gears.

5. In combination, an internal combustion engine having a power shaft, an electric dynamo having an adjustable mounting upon said engine, means including a flexible belt for driving said dynamo from said power shaft, a second means including intermeshing gears for driving said power shaft from said dynamo used as a motor, the tension of said flexible belt being adjustable by changing the position of said dynamo upon said adjustable mounting while the adjustment of said gears remains unchanged.

6. In combination, an internal combustion engine having a power shaft, an electric dynamo rigidly mounted upon said engine but adjustable thereto about a pivot eccentric to the axis of said dynamo, means including a flexible belt for driving said dynamo from said power shaft, a second means including intermeshing gears one of which is in alignment with said pivot for driving said power shaft from said dynamo when used as a motor, the tension of said flexible belt being adjustable by adjusting the position of said dynamo about said pivot while the adjustment of said intermeshing gears remains unchanged.

7. In combination, an internal-combustion engine having a power shaft, an electric dynamo rigidly mounted upon said engine but adjustable thereto about a pivot eccentric to the axis of said dynamo, means including a flexible belt for driving said dynamo from said power shaft, and means for transmitting motion from the dynamo, when used as a motor, to the engine shaft, said means including an endwise movable jack shaft coaxial with said pivot, gears mounted upon the jack shaft and movable therewith as a unit, and gears mounted respectively upon the shaft of the dynamo and said engine shaft and engaged respectively by said jack shaft gears.

8. In combination, an internal combustion engine having a flywheel with gear teeth thereon, an electric motor having a commutator and brushes adapted to be moved into and out of contact with the commutator and having a driving pinion for starting said engine, a driving connection between said motor pinion and flywheel gear including a reciprocable jack shaft, a spur gear mounted thereon and intermeshing with said pinion, a second spur gear mounted thereon and intermeshing with said flywheel, said jack shaft and spur gears being reciprocable as a unit to establish and disestablish the driving connection between said pinion and flywheel and mechanism including a camming member carried by the jack shaft for controlling the movements of the brushes into and out of contact with said commutator.

9. In combination, an internal combustion engine having a power shaft, an electric dynamo rigidly mounted upon said engine but adjustable thereto about a pivot eccentric to the axis of said dynamo, means including a flexible belt for driving said dynamo from said power shaft, means for transmitting from the dynamo, when used as a motor, to the engine shaft and including an endwise movable shaft in alignment with said pivot, a dynamo circuit controller carried by the dynamo, and means connected with the shaft for operating the controller in any position of adjustment of the dynamo about said pivot.

In testimony whereof I hereto affix my signature.

ZERBE C. BRADFORD.